United States Patent
Yamada et al.

(10) Patent No.: US 10,601,268 B2
(45) Date of Patent: Mar. 24, 2020

(54) ROTOR OF ELECTRIC MOTOR, AND METHOD FOR MANUFACTURING ROTOR

(71) Applicant: FANUC CORPORATION, Yamanashi (JP)

(72) Inventors: Yasuo Yamada, Yamanashi (JP); Akira Nishifukumoto, Yamanashi (JP)

(73) Assignee: FANUC CORPORTION, Yamanashi (JP)

( * ) Notice: Subject to any disclaimer, the term of this patent is extended or adjusted under 35 U.S.C. 154(b) by 495 days.

(21) Appl. No.: 15/397,838

(22) Filed: Jan. 4, 2017

(65) Prior Publication Data

US 2017/0201139 A1   Jul. 13, 2017

(30) Foreign Application Priority Data

Jan. 12, 2016   (JP) ................................ 2016-003638

(51) Int. Cl.
*H02K 1/27* (2006.01)
*H02K 1/28* (2006.01)
*H02K 15/03* (2006.01)
*H02K 15/14* (2006.01)

(52) U.S. Cl.
CPC ........... *H02K 1/2706* (2013.01); *H02K 1/278* (2013.01); *H02K 15/03* (2013.01); *H02K 15/14* (2013.01)

(58) Field of Classification Search
CPC .............................................. H02K 1/27–2793
USPC .................... 310/156.01, 156.12, 156.31
See application file for complete search history.

(56) References Cited

U.S. PATENT DOCUMENTS 5,801,470 A * 9/1998 Johnson ............... H02K 1/2733
310/156.27
2011/0000079 A1   1/2011 Fukumaru et al.

FOREIGN PATENT DOCUMENTS

| CN | 206481126 U |   | 9/2017 |
|----|----|----|----|
| JP | 62166755 A |   | 7/1987 |
| JP | 1270756 A |   | 10/1989 |
| JP | 200014062 A |   | 1/2000 |
| JP | 2005117732 A | * | 4/2005 |
| JP | 2005117732 A |   | 4/2005 |
| JP | 2013169103 A |   | 8/2013 |

OTHER PUBLICATIONS

Machine Translation, Saito, JP-2005117732-A, Apr. 2005. (Year: 2005).*
English Abstract and Machine Translation for Japanese Publication No. 2013-169103, published Aug. 29, 2013, 16 pgs.
English Abstract and Machine Translation for Japanese Publication No. 2005-117732 A, published Apr. 28, 2005, 10 pgs.

(Continued)

*Primary Examiner* — Thomas Truong
(74) *Attorney, Agent, or Firm* — Fredrikson & Byron, P.A.

(57) ABSTRACT

A rotor capable of preventing a magnet or a cover tube from being damaged by contacting a mold of an injection machine during production. The rotor includes a rotor core, a plurality of magnets arranged on the outside of the rotor core in the radial direction, a cylindrical cover tube surrounding the plurality of magnets, and resin charged to a gap defined between an outer peripheral surface of the rotor core and an inner peripheral surface of the cover tube. An axial dimension of the rotor core is greater than an axial dimension of each magnet, and an axial dimension of the cover tube.

2 Claims, 13 Drawing Sheets

(56) References Cited

OTHER PUBLICATIONS

English Abstract and Machine Translation for Japanese Publication No. 2000-014062 A, published Jan. 14, 2000, 9 pgs.
English Abstract and Machine Translation for Japanese Publication No. 01-270756 A, published Oct. 30, 1989, 6 pgs.
English Abstract and Machine Translation for Japanese Publication No. 62-166755 A, published Jul. 23, 1987, 5 pgs.
English Abstract and Machine Translation for Chinese Publication No. 206481126 U, published Sep. 8, 2017, 8 pgs.

* cited by examiner

ROTOR OF ELECTRIC MOTOR, AND METHOD FOR MANUFACTURING ROTOR

BACKGROUND OF THE INVENTION

1. Field of the Invention

The invention relates to a rotor of an electric motor, and a method for manufacturing a rotor.

2. Description of the Related Art

A rotor of an electric motor, which includes a rotor core, a plurality of magnets arranged on the outside of the rotor core in the radial direction, a cylindrical cover tube surrounding the magnets, and resin charged to a gap between the rotor core and the cover tube, has been known (for example, Japanese Unexamined Patent Publication (Kokai) No. 2013-169103).

In general, such a rotor is produced by injecting resin to the gap using an injection machine. In this instance, each magnet or the cover tube abuts with a mold of the injection machine, and thus, the magnets or the cover tube may be broken.

SUMMARY OF THE INVENTION

In one aspect of the invention, a rotor of an electric motor includes a rotor core, a plurality of magnets arranged radially outside of the rotor core, a cylindrical cover tube surrounding the plurality of magnets, and resin filled in a gap formed between an outer peripheral surface of the rotor core and an inner peripheral surface of the cover tube. An axial dimension of the rotor core is greater than axial dimensions of the plurality of magnets, and is greater than an axial dimension of the cover tube. The axial dimension of the cover tube may be greater than the axial dimensions of the plurality of magnets.

In another aspect of the invention, a method of producing a rotor includes arranging a plurality of magnets at radially outside of the rotor core, arranging a cylindrical cover tube so as to surround the plurality of magnets, and contacting a first mold with an end face of the rotor core in one direction of the axial direction.

The method further includes contacting a second mold formed with a resin-injection nozzle with an end face of the rotor core in the other direction of the axial direction, so that the resin-injection nozzle faces a gap formed between an outer peripheral surface of the rotor core and an inner peripheral surface of the cover tube, and that the second mold is separated away from end faces of the cover tube and the plurality of magnets in the other direction of the axial direction, toward the other direction of the axial direction.

BRIEF DESCRIPTION OF THE DRAWINGS

These and other objects, features, and advantages of the invention will be clarified from the detailed description of embodiments illustrated in the accompanying drawings, in which.

DETAILED DESCRIPTION

Embodiments of the invention will be described below in detail based on the drawings. First, with reference to FIGS. 1 and 2, a rotor 10 according to an embodiment of the invention will be described.

Note that, in the following description, an axial direction corresponds to a direction along a rotational axis O of the rotor, a radial direction corresponds to a radial direction of a circle centered about the axis O, and a circumferential direction corresponds to the circumferential direction of the circle. Further, for convenience, the left direction in FIGS. 1, 3, and 6 to 13 corresponds to the front direction in the axial direction (axially frontward).

Figure 1:
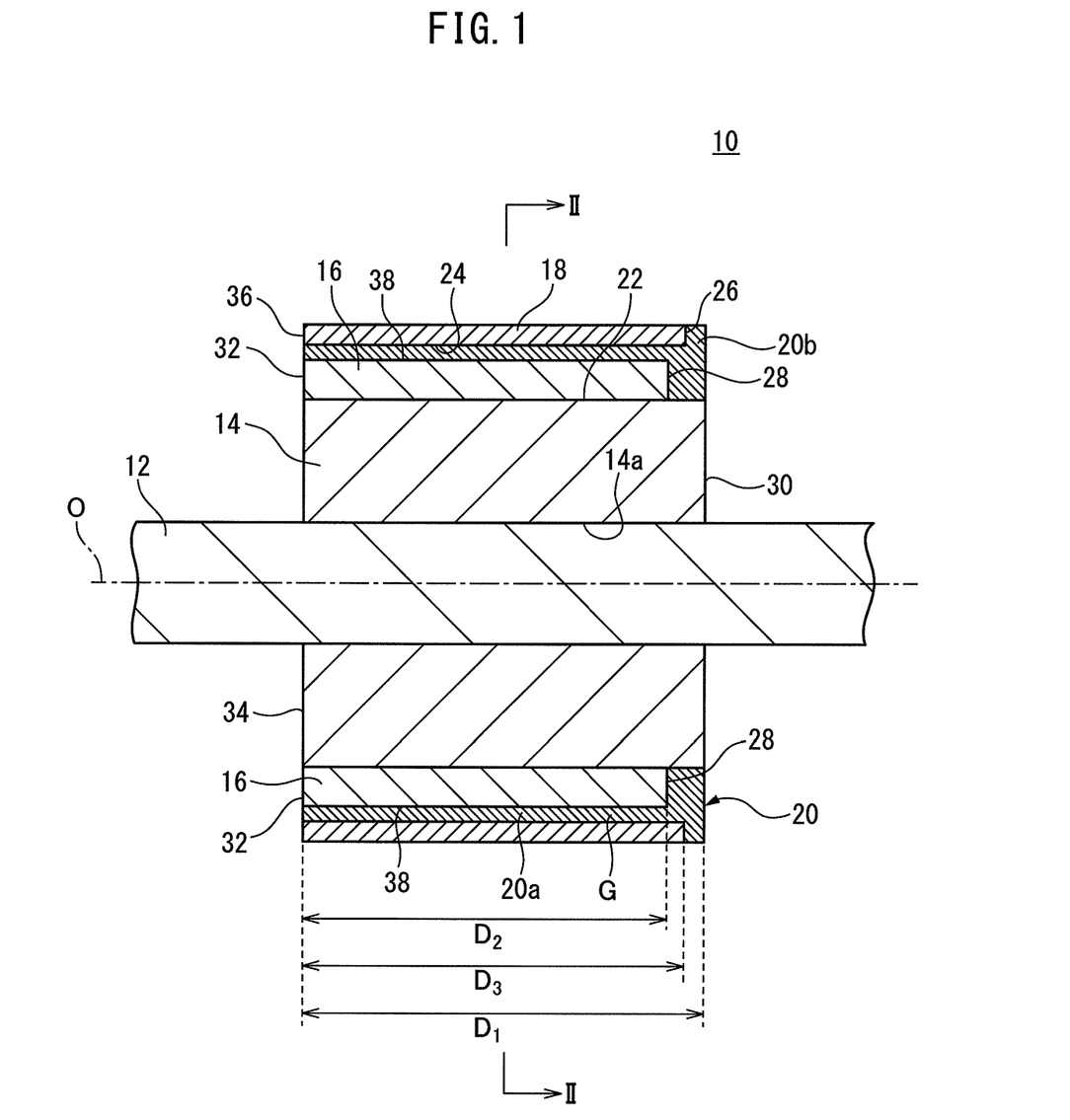
FIG. 1 is a cross-sectional side view of a rotor according to an embodiment of the invention.
Figure 2:
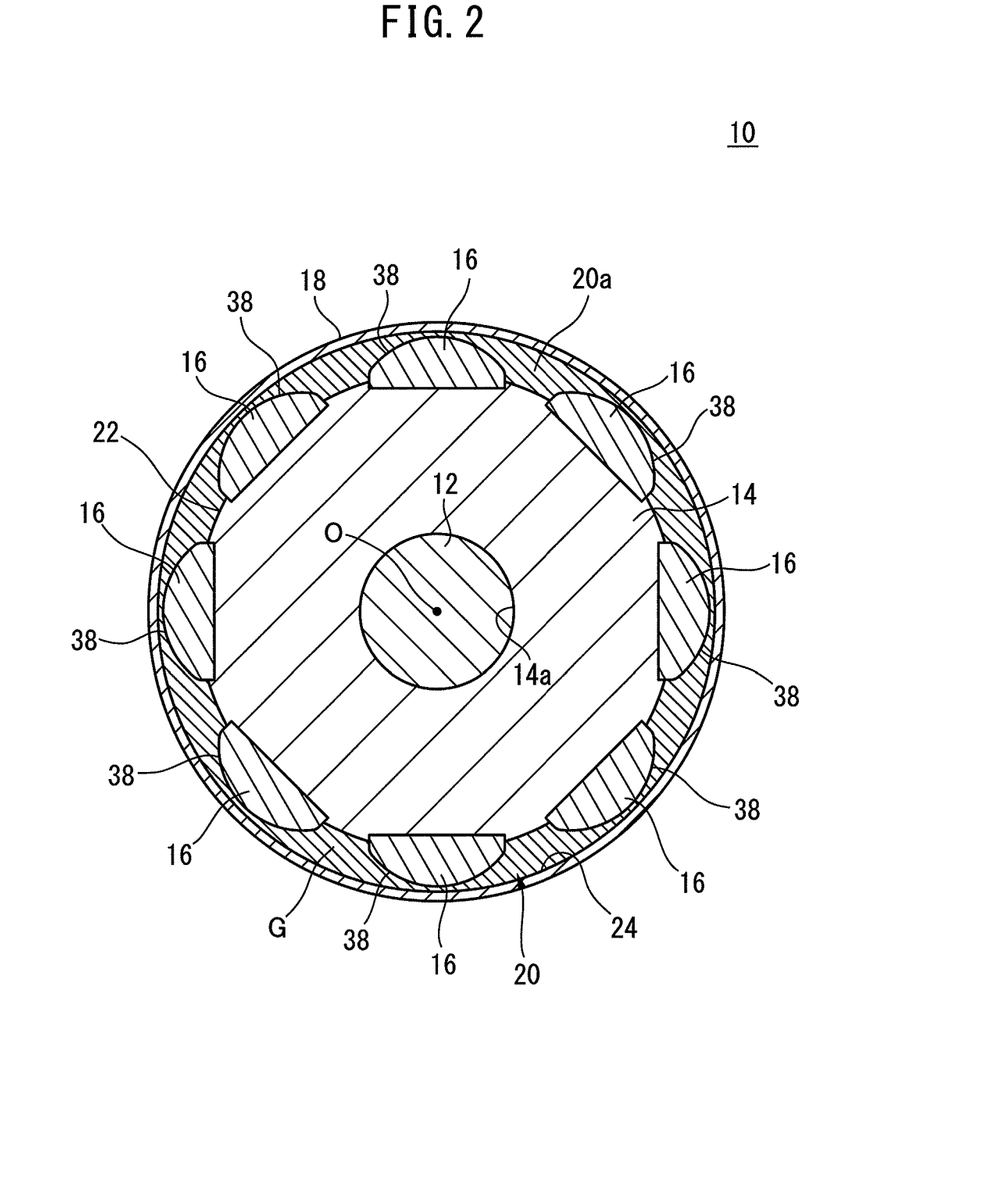
FIG. 2 is a cross-sectional view of the rotor shown in FIG. 1, cut along II-II in FIG. 1.

The rotor 10 is rotatably arranged radially inside of a stator (not shown) of an electric motor, and constitutes the electric motor together with the stator. The rotor 10 includes a rotary shaft 12, a rotor core 14, a plurality of magnets 16, a cover tube 18, and resin 20. The rotary shaft 12 is a columnar member extending in the axial direction.

The rotor core 14 is a cylindrical member fixed radially outside of the rotary shaft 12. The rotor core 14 is arranged so as to be centered about the axis O. The rotor core 14 is comprised of a plurality of magnetic steel sheets stacked in the axial direction. A through-hole 14a is formed at a center of the rotor core 14, and the rotary shaft 12 is inserted into the through-hole 14a. The rotor core 14 has an axial dimension $D_1$.

Each of the plurality of magnets 16 is an elongated magnetic member (e.g., neodymium or ferrite) extending in the axial direction, and is fixed on an outer peripheral surface 22 of the rotor core 14. In this embodiment, a total of eight magnets 16 are arranged to align in the circumferential direction at substantially equal intervals. Each of the magnets 16 has an axial dimension $D_2$. In this respect, the axial dimension $D_2$ of each magnet 16 is smaller than the axial dimension $D_1$ of the rotor core 14 (i.e., $D_2<D_1$).

In this embodiment, axially rear end faces 28 of all of the magnets 16 are arranged so as to be separate axially frontward from an axially rear end face 30 of the rotor core 14. On the other hand, axially front end faces 32 of the magnets 16 are arranged at an axial position substantially the same as axially front end face 34 of the rotor core 14.

The cover tube 18 is a cylindrical member surrounding the magnets 16 from radially outside. The cover tube 18 is made of a non-magnetic material, such as stainless steel, and is arranged so as to be centered about the axis O. In this respect, the axial dimension $D_3$ of the cover tube 18 is smaller than the axial dimension $D_1$ of the rotor core 14, and is greater than the axial dimension $D_2$ of each magnet 16 (i.e., $D_2<D_3<D_1$).

In this embodiment, an axially rear end face 26 of the cover tube 18 is arranged so as to be separate axially rearward from the axially rear end faces 28 of all of the magnets 16, and is arranged so as to be separate axially frontward from the axially rear end face 30 of the rotor core 14. On the other hand, an axially front end face 36 of the cover tube 18 is arranged at an axial position substantially the same as the axially front end face 34 of the rotor core 14.

The resin 20 is filled in a gap G formed between the outer peripheral surface 22 of the rotor core 14 and an inner peripheral surface 24 of the cover tube 18, and between outer surfaces 38 of the magnets 16 and the inner peripheral surface 24. More specifically, the resin 20 includes a main body 20a filled in the gap G in the axial section of the magnets 16, and a ring 20b coupled to an axially rear end of the main body 20a.

The ring 20b is located at axially rearward of the axially rear end face 26 of the cover tube 18 and the axially rear end faces 28 of the magnets 16, and contacts these end faces 26 and 28 from axially rear side. Further, the ring 20b contacts the axially rear end portion of the inner peripheral surface 24 of the cover tube 18.

Figure 3:
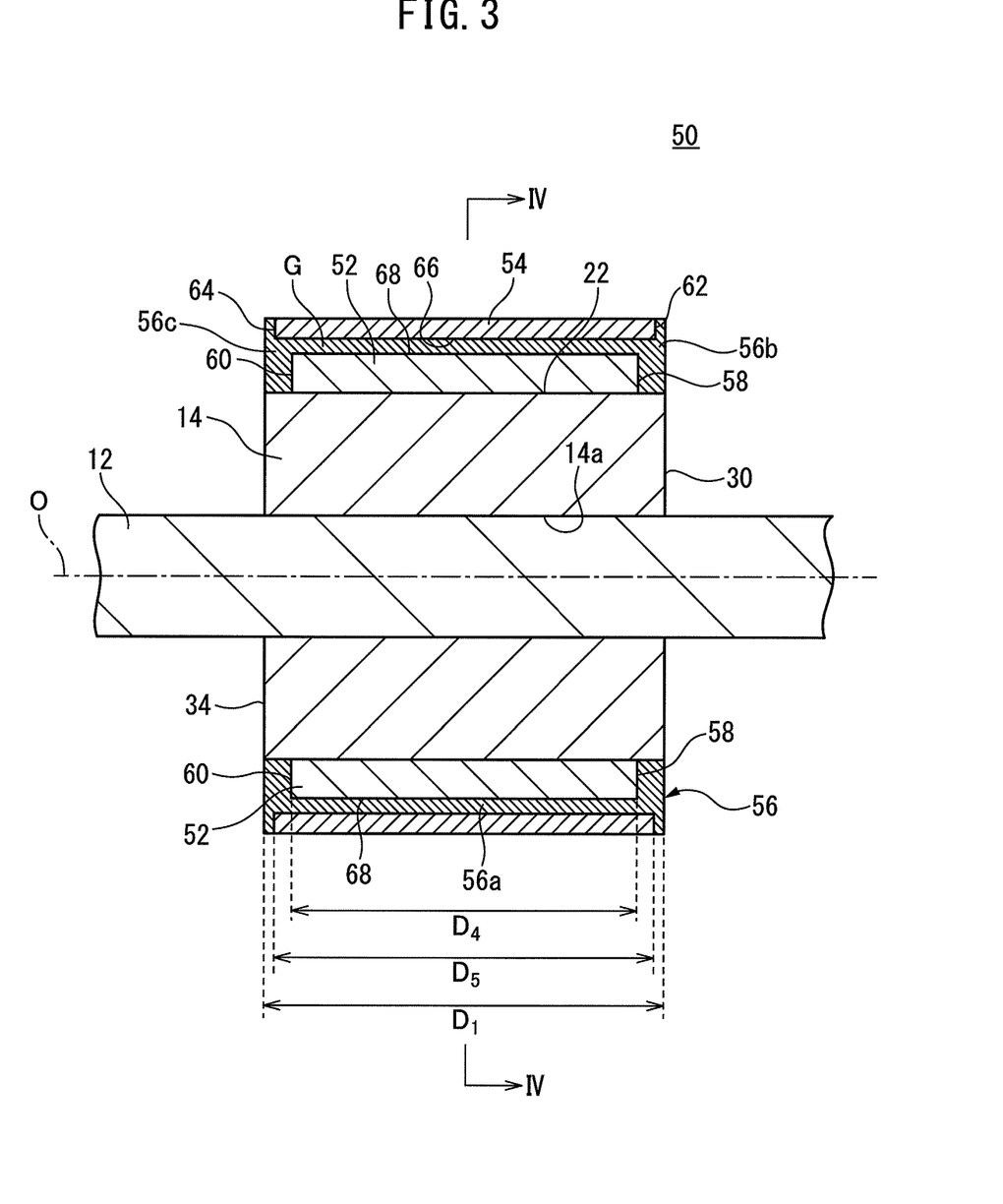
FIG. 3 is a cross-sectional side view of a rotor according to another embodiment of the invention.

Next, a rotor 50 according to another embodiment of the invention will be described with reference to FIG. 3. Note that, in various embodiments described below, elements similar to those of the already-mentioned embodiments are assigned the same reference numerals, and the detailed descriptions thereof will be omitted.

The rotor 50 includes the rotary shaft 12, the rotor core 14, a plurality of magnets 52, a cover tube 54, and resin 56.

Figure 4:
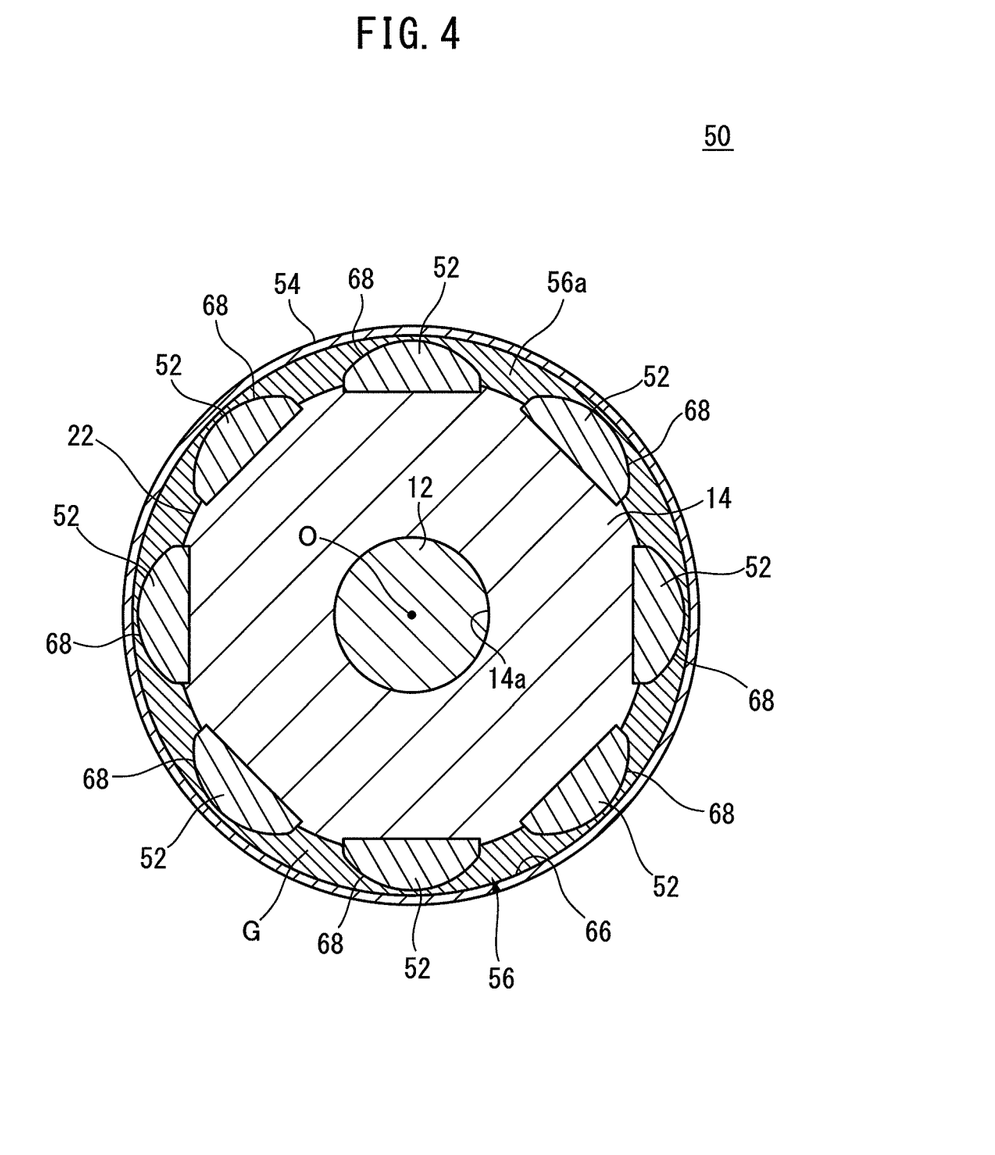
FIG. 4 is a cross-sectional view of the rotor shown in FIG. 3, cut along IV-IV in FIG. 3.

Each of the plurality of magnets 52 is an elongated magnetic member extending in the axial direction, and is fixed on the outer peripheral surface 22 of the rotor core 14. Similarly to the above-mentioned embodiment, a total of eight magnets 52 are arranged to align in the circumferential direction at substantially equal intervals. Each of the magnets 16 has an axial dimension $D_4$. The axial dimension $D_4$ of each magnet 52 is smaller than the axial dimension $D_1$ of the rotor core 14 (i.e., $D_4<D_1$).

In this embodiment, axially rear end faces 58 of all of the magnets 52 are located so as to be separate axially forward from the axially rear end face 30 of the rotor core 14. Further, axially front end faces 60 of all of the magnets 52 are located so as to be separate axially rearward from the axially front end face 34 of the rotor core 14.

The cover tube 54 is a cylindrical member surrounding the magnets 52 from radially outside. In this respect, an axial dimension $D_5$ of the cover tube 54 is smaller than the axial dimension $D_1$ of the rotor core 14, and is greater than the axial dimension $D_4$ of each magnet 52 (i.e., $D_4<D_5<D_1$).

An axially rear end face 62 of the cover tube 54 is located so as to be separate axially rearward from the axially rear end faces 58 of the magnets 52, and is located so as to be separate axially forward from the axially rear end face 30 of the rotor core 14.

Further, an axially front end face 64 of the cover tube 54 is located so as to be separate axially forward from the axially front end faces 60 of the magnets 52, and is located so as to be separate axially rearward from the axially front end face 34 of the rotor core 14.

The resin 56 is filled in a gap G formed between the outer peripheral surface 22 of the rotor core 14 and an inner peripheral surface 66 of the cover tube 54, and between outer surfaces 68 of the magnets 52 and the inner peripheral surface 66.

More specifically, the resin 56 includes a main body 56a filled in the gap G in the axial section of the magnets 52, a first ring 56b coupled to an axially rear end of the main body 56a, and a second ring 56c coupled to an axially front end of the main body 56a.

The first ring 56b is arranged at axially rearward of the axially rear end face 62 of the cover tube 54 and the axially rear end faces 58 of the magnets 52, and contacts these end faces 62 and 58 from axially rear side. Further, the first ring 56b contacts an axially rear end portion of the inner peripheral surface 66 of the cover tube 54.

On the other hand, the second ring 56c is arranged at axially forward of the axially front end face 64 of the cover tube 54 and the axially front end faces 60 of the magnets 52, and contacts these end faces 64 and 60 from axially front side. Further, the second ring 56c contacts an axially front end portion of the inner peripheral surface 66 of the cover tube 54.

Figure 5:
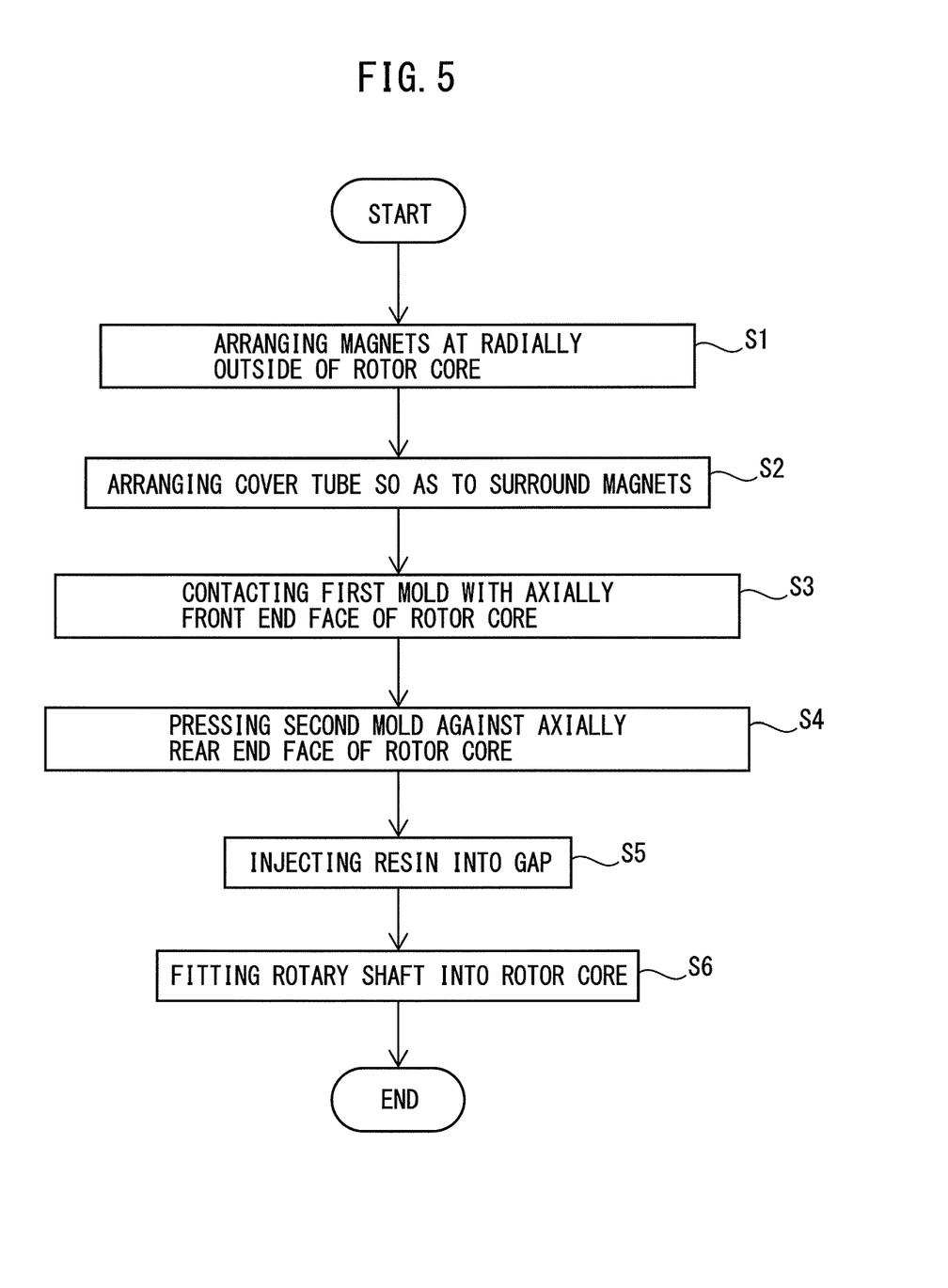
FIG. 5 is a flowchart of an example of a method of producing a rotor.

Next, a method of producing the rotors 10 or 50 will be described with reference to FIG. 5. At step S1, a manufacturer arranges a plurality of magnets 16 or 52 at radially outside of the rotor core 14.

As an example, if the rotor 10 is produced, the manufacturer stacks a plurality of magnetic steel sheets in the axial direction so as to make the rotor core 14. The manufacturer prepares a total of eight magnets 16, each of which has the axial dimension $D_2$. Then, the manufacturer fixes the eight magnets 16 on the outer peripheral surface 22 of the rotor core 14 so as to align in the circumferential direction at substantially equal intervals.

Figure 6:
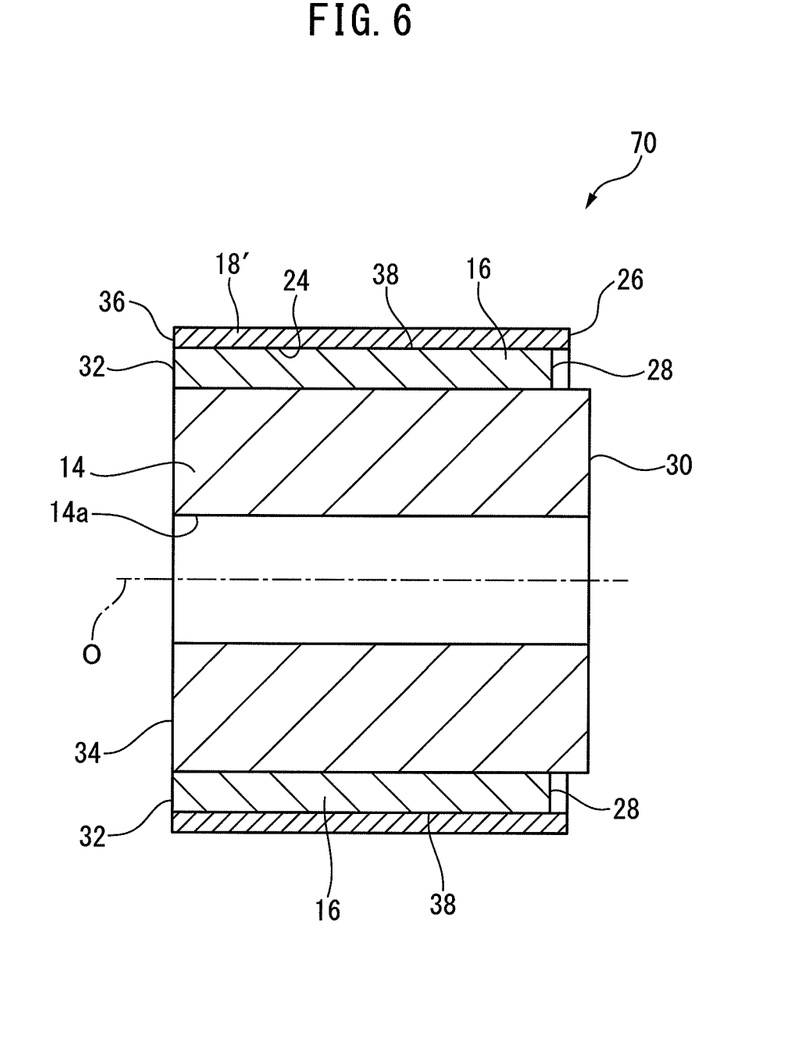
FIG. 6 is a cross-sectional side view of an assembly produced at step S2 in FIG. 5 when the rotor shown in FIG. 1 is produced.

At this time, the axially rear end faces 28 of all of the magnets 16 are arranged to be separate axially forward from the axially rear end face 30 of the rotor core 14. On the other hand, the axially front end faces 32 of the magnets 16 are arranged at the axial position substantially the same as the axially front end face 34 of the rotor core 14 (FIG. 6).

As another example, if the rotor 50 is produced, the manufacturer stacks a plurality of magnetic steel sheets in the axial direction so as to make the rotor core 14. The manufacturer prepares a total of eight magnets 16, each of which has the axial dimension $D_4$. Then, the manufacturer fixes the eight magnets 52 on the outer peripheral surface 22 of the rotor core 14 so as to align in the circumferential direction at substantially equal intervals.

Figure 7:
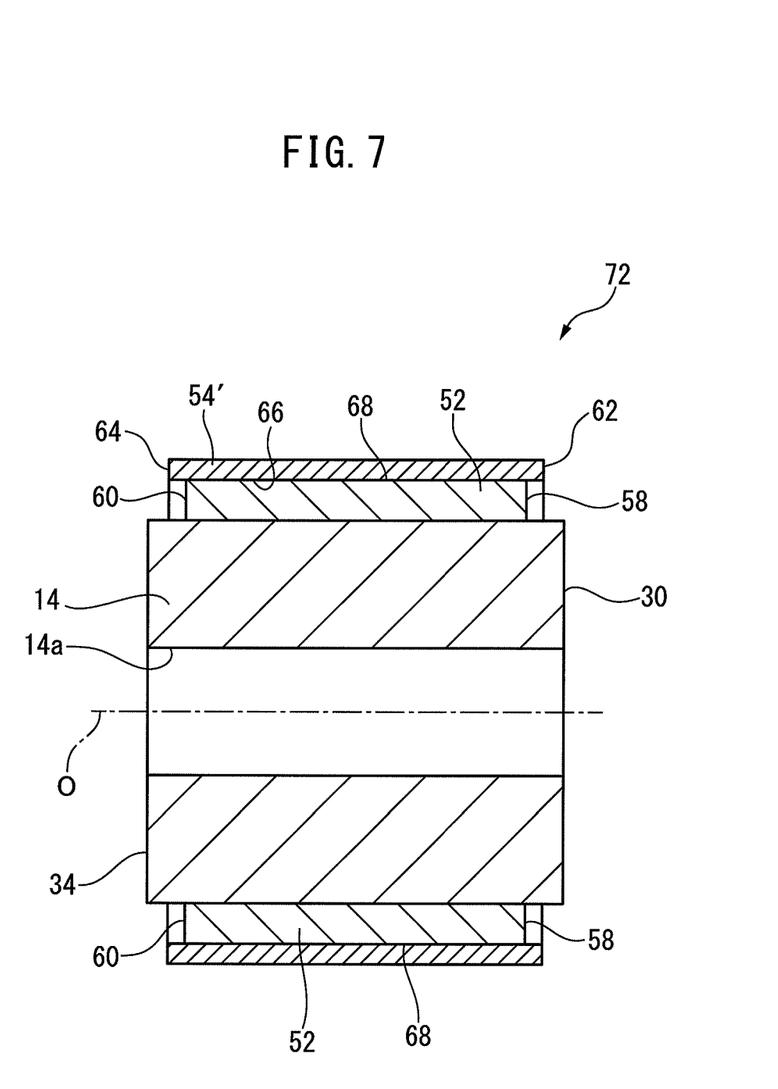
FIG. 7 is a cross-sectional side view of an assembly produced at step S2 in FIG. 5 when the rotor shown in FIG. 3 is produced.

At this time, the axially rear end faces 58 of all of the magnets 52 are arranged so as to be separate axially forward from the axially rear end face 30 of the rotor core 14. Further, the axially front end faces 60 of the magnets 52 are arranged so as to be separate axially rearward from the axially front end face 34 of the rotor core 14 (FIG. 7).

Note that, at this step S1, the manufacturer may fix the magnets 16 or 52 on the outer peripheral surface 22 of the rotor core 14 by e.g. an adhesive.

At step S2, the manufacturer arranges a cover tube 18' or 54' so as to surround the plurality of magnets 16 or 52.

As an example, if the rotor 10 is produced, the manufacturer prepares the cover tube 18' (FIG. 6). The cover tube 18' is a cylindrical member having a diameter smaller than that of the cover tube 18 shown in FIGS. 1 and 2, and having the axial dimension $D_3$ the same as the cover tube 18. Then, the manufacturer fits the cover tube 18' over the magnets 16 fixed on the rotor core 14 so as to surround the magnets 16 from radially outside.

This state is shown in FIG. 6.

At this step S2, the axially rear end face 26 of the cover tube 18' is arranged so as to separate axially rearward from the axially rear end faces 28 of the magnets 16, and arranged so as to be separate axially forward from the axially rear end face 30 of the rotor core 14. On the other hand, the axially front end face 36 of the cover tube 18' is arranged at the axial position substantially the same as the axially front end face 34 of the rotor core 14.

By this step S2, an assembly 70 comprised of the rotor core 14, the magnets 16, and the cover tube 18' is produced. In the assembly 70, the inner peripheral surface 24 of the cover tube 18' contacts the outer surfaces 38 of the magnets 16.

As another example, if the rotor 50 is produced, the manufacturer prepares a cover tube 54' (FIG. 7). The cover tube 54' is a cylindrical member having a diameter smaller than that of the cover tube 54 shown in FIGS. 3 and 4, and having the axial dimension $D_5$ the same as the cover tube 54. Then, the manufacturer fits the cover tube 54' over the magnets 52 fixed on the rotor core 14 so as to surround the magnets 52 from radially outside. This state is shown in FIG. 7.

At this step S2, the axially rear end face 62 of the cover tube 54' is arranged so as to be separate axially rearward from the axially rear end faces 58 of the magnets 52, and arranged so as to be separate axially frontward from the axially rear end face 30 of the rotor core 14.

Further, the axially front end face 64 of the cover tube 54' is arranged so as to be separate axially frontward from the axially front end faces 60 of the magnets 52, and is arranged so as to be separate axially rearward from the axially front end face 34 of the rotor core 14.

By this step S2, an assembly 72 comprised of the rotor core 14, the magnets 52, and the cover tube 54' is produced. In the assembly 72, the inner peripheral surface 66 of the cover tube 54' contacts the outer surfaces 68 of the magnets 52.

At step S3, the manufacturer contacts a first mold 82 of an injection machine 80 with the axially front end face 34 of the rotor core 14. Below, with reference to FIG. 8, the injection machine 80 according to this embodiment will be described.

Figure 8:
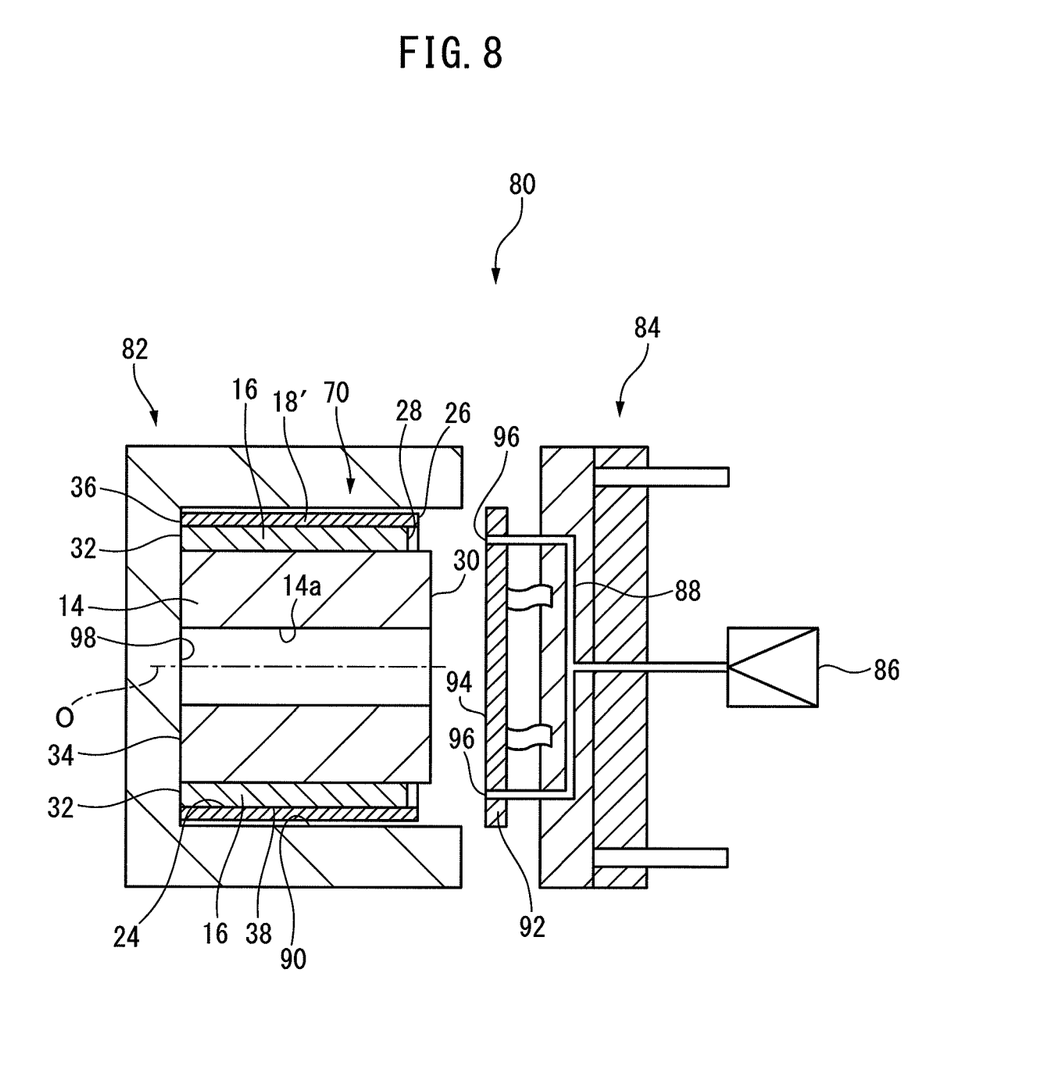
FIG. 8 is a cross-sectional view showing a state at the end of step S3 in FIG. 5 when the rotor shown in FIG. 1 is produced.

The injection machine 80 includes the first mold 82, a second mold 84, a resin supply unit 86, and a hot runner 88. A circular-shaped cavity 90 is formed at the first mold 82.

The second mold 84 is installed so as to move in directions toward and away from the first mold 82. The second mold 84 includes a pressurizing plate 92 on the side facing the first mold 82. The pressurizing plate 92 has a circular shape corresponding to the cavity 90, and includes a planar pressurizing surface 94 facing the cavity 90. The resin supply unit 86 supplies resin, which is liquefied by heating, into the hot runner 88.

The hot runner 88 includes a heater (not shown), and delivers the resin supplied from the resin supply unit 86, along with the resin being kept in a liquid state. Resin-injection nozzles 96 are provided at outlets of the hot runner 88.

The resin-injection nozzles 96 open to the outside on the pressurizing surface 94 of the pressurizing plate 92. The resin supplied from the resin supply unit 86 into the hot runner 88 passes through the hot runner 88, and is injected out from the resin-injection nozzles 96.

At this step S3, the manufacturer places the assembly 70 or 72 made at step S2 in the cavity 90 of the first mold 82.

As an example, if the rotor 10 is produced, the manufacturer inserts the assembly 70 made at step S2 into the cavity 90 of the first mold 82, so that the axially front end face 34 of the rotor core 14 contacts a bottom face 98 which defines the cavity 90.

This state is shown in FIG. 8. In the example shown in FIG. 8, the axially front end face 34 of the rotor core 14, the axially front end faces 32 of the magnets 16, and the axially front end face 36 of the cover tube 18' are in surface-contact with the bottom face 98 of the cavity 90.

Figure 9:
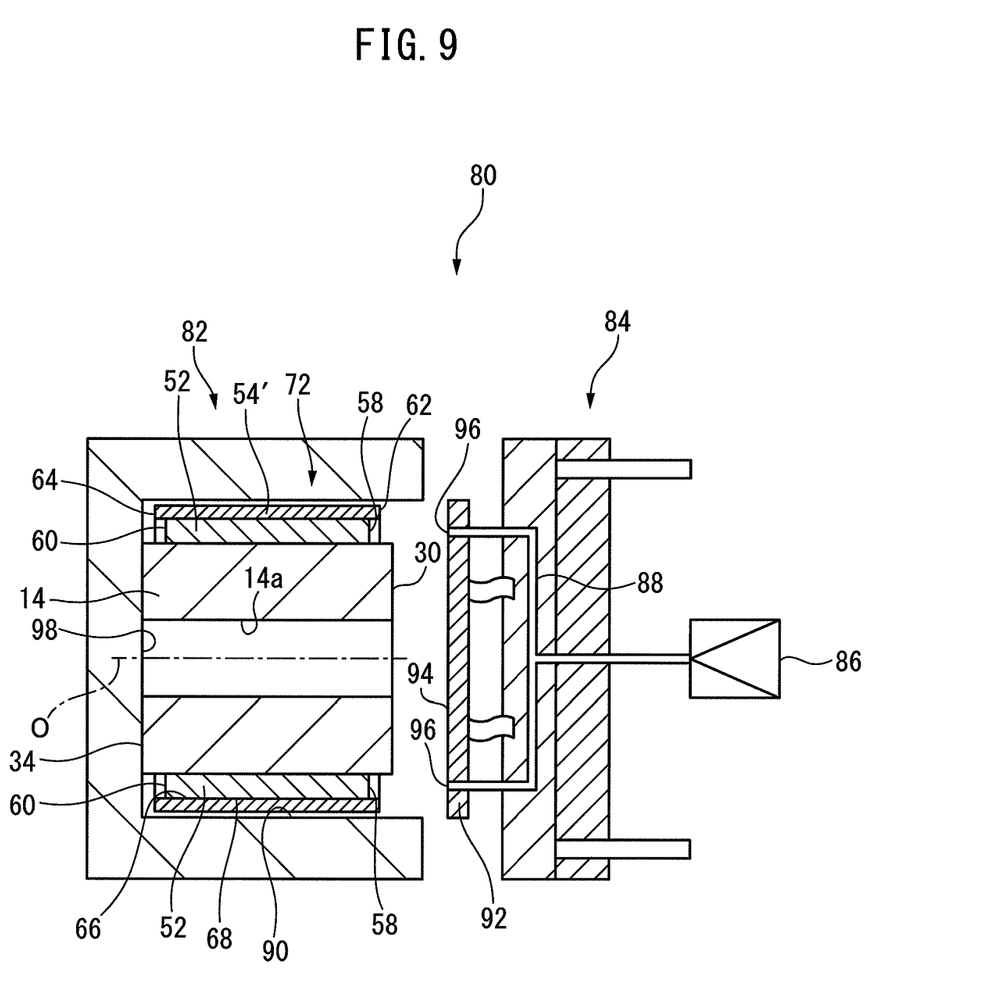
FIG. 9 is a cross-sectional view showing a state at the end of step S3 in FIG. 5 when the rotor shown in FIG. 3 is produced.

As another example, if the rotor 50 is produced, at this step S3, the manufacturer inserts the assembly 72 made at step S2 into the cavity 90 of the first mold 82, so that the axially front end face 34 of the rotor core 14 contacts the bottom face 98 of the cavity 90.

This state is shown in FIG. 9. In the example shown in FIG. 9, the axially front end face 34 of the rotor core 14 is in surface-contact with the bottom face 98 of the cavity 90, whereas the axially front end faces 60 of the magnets 52 and the axially front end face 64 of the cover tube 54' are separate axially rearward from the bottom face 98.

Figure 10:
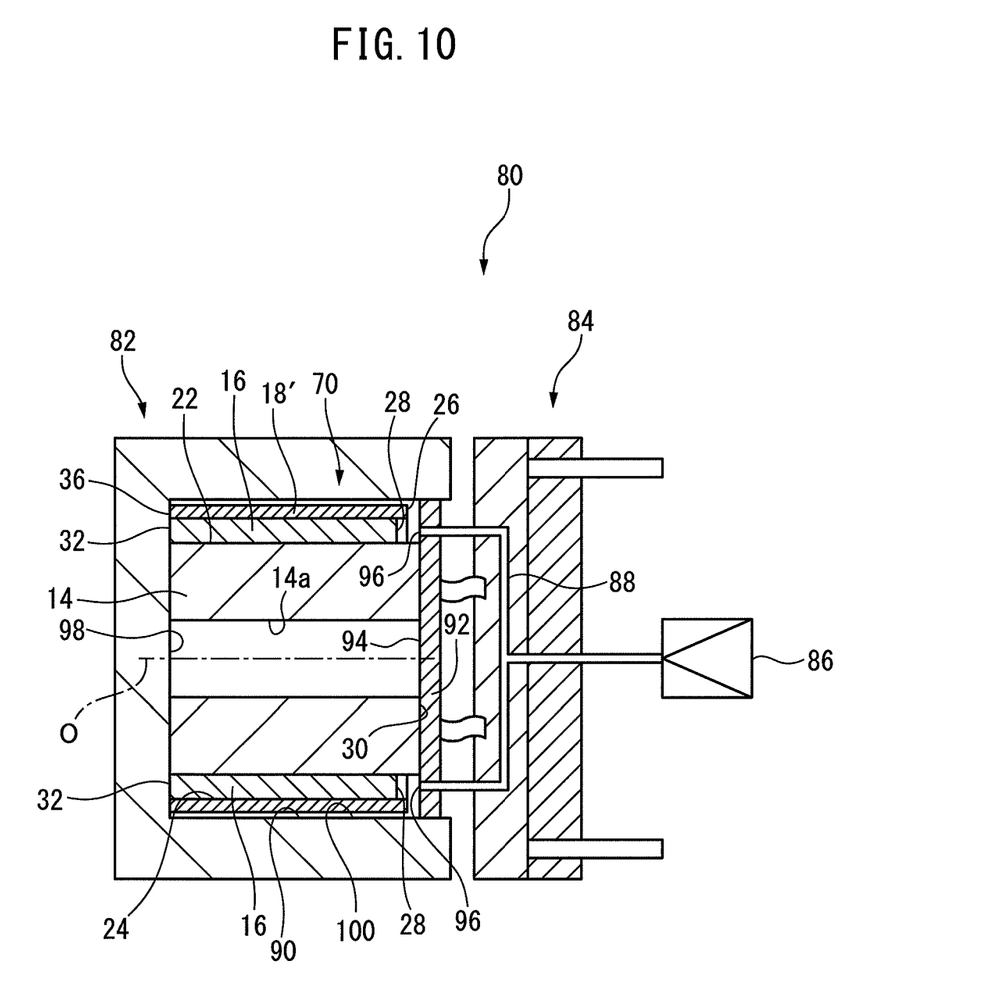
FIG. 10 a cross-sectional view showing a state at the end of step S4 in FIG. 5 when the rotor shown in FIG. 1 is produced.

At step S4, the injection machine 80 presses the second mold 84 against the axially rear end face 30 of the rotor core 14 so as to close the cavity 90 of the first mold 82 by the second mold 84 (this is so-called mold clamping process).

As an example, if the rotor 10 is produced, the injection machine 80 moves the second mold 84 toward the first mold 82 so as to press the pressurizing plate 92 of the second mold 84 against the axially rear end face 30 of the rotor core 14 of the assembly 70. Due to this, the cavity 90 of the first mold 82 is closed by the pressurizing plate 92.

This state is shown in FIG. 10. In the example shown in FIG. 10, the end face 30 of the rotor core 14 is in surface-contact with the pressurizing surface 94 of the pressurizing plate 92, whereas the axially rear end faces 28 of the magnets 16 and the axially rear end face 26 of the cover tube 18' are separate axially forward from the pressurizing surface 94.

Further, the cover tube 18' is separate radially inward from a side face 100 which defines the cavity 90. Further, the resin-injection nozzles 96 provided on the pressurizing surface 94 of the pressurizing plate 92 are arranged so as to face a gap between the inner peripheral surface 24 of the cover tube 18' and the outer peripheral surface 22 of the rotor core 14.

As described above, the axial dimension $D_1$ of the rotor core 14 is set to be greater than the axial dimension $D_2$ of each magnet 16 and the axial dimension $D_3$ of the cover tube 18. According to this configuration, when the pressurizing plate 92 is pressed against the end face 30 of the rotor core 14 at this step S4, it is possible to arrange the axially rear end faces 28 of the magnets 16 and the axially rear end face 26 of the cover tube 18' so to as to be separate away from the pressurizing surface 94, as shown in FIG. 10.

Thereby, since the application of a large pressing force from the pressurizing plate 92 to the magnets 16 and the cover tube 18' can be avoided, it is possible to prevent the magnets 16 and the cover tube 18' from being damaged by the pressing force from the pressurizing plate 92.

Figure 11:
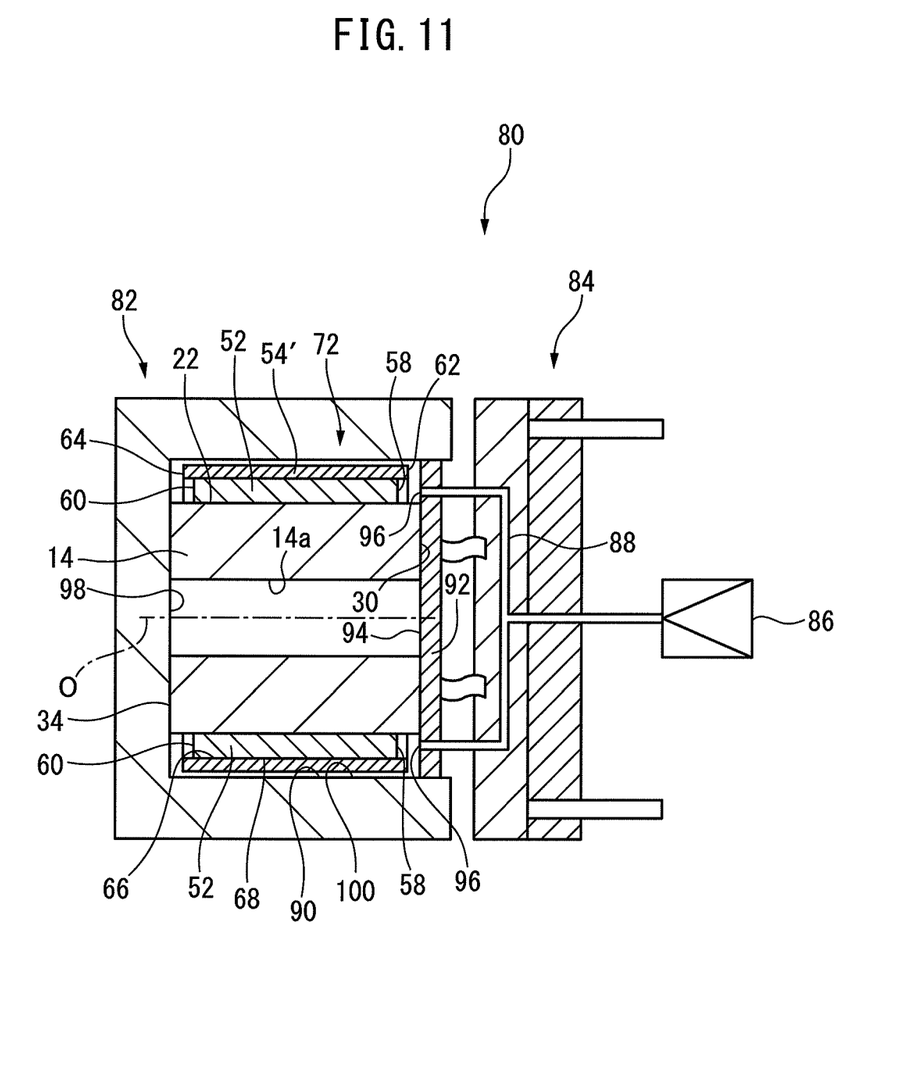
FIG. 11 is a cross-sectional view showing a state at the end of step S4 in FIG. 5 when the rotor shown in FIG. 3 is produced.

As another example, if the rotor 50 is produced, the injection machine 80 moves the second mold 84 toward the first mold 82 so as to press the pressurizing plate 92 of the second mold 84 against the axially rear end face 30 of the rotor core 14 of the assembly 72.

This state is shown in FIG. 11. In the example shown in FIG. 11, the end face 30 of the rotor core 14 is in surface-contact with the pressurizing surface 94 of the pressurizing plate 92, whereas the axially rear end faces 58 of the magnets 52 and the axially rear end face 62 of the cover tube 54' are separate axially forward from the pressurizing surface 94.

Further, the cover tube 54' is separate radially inward from the side face 100 of the cavity 90. Further, the resin-injection nozzles 96 are arranged so as to face a gap between the inner peripheral surface 66 of the cover tube 54' and the outer peripheral surface 22 of the rotor core 14.

As described above, the axial dimension $D_1$ of the rotor core 14 is set to be greater than the axial dimension $D_4$ of each magnet 52 and the axial dimension $D_5$ of the cover tube 54. According to this configuration, when the pressurizing plate 92 is pressed against the end face 30 of the rotor core 14 at this step S4, it is possible to arrange the axially rear end faces 58 of the magnets 52 and the axially rear end face 62 of the cover tube 54' so as to be separate away from the pressurizing surface 94, as shown in FIG. 11.

Thereby, since the application of a large pressing force from the pressurizing plate 92 to the magnets 52 and the cover tube 54' can be avoided, it is possible to prevent the magnets 52 and the cover tube 54' from being damaged by the pressing force from the pressurizing plate 92.

Further, according to the assembly 72, it is also possible to arrange the axially front end faces 60 of the magnets 52 and the axially front end face 64 of the cover tube 54' so as to be separate away from the bottom face 98 of the cavity 90, when the pressurizing plate 92 is pressed against the end face 30 of the rotor core 14.

Thereby, since the application of a pressing force to the magnets 52 and the cover tube 54' can be reliably avoided, it is possible to reliably prevent the magnets 52 and the cover tube 54' from being damaged by the pressing force from the pressurizing plate 92.

Figure 12:
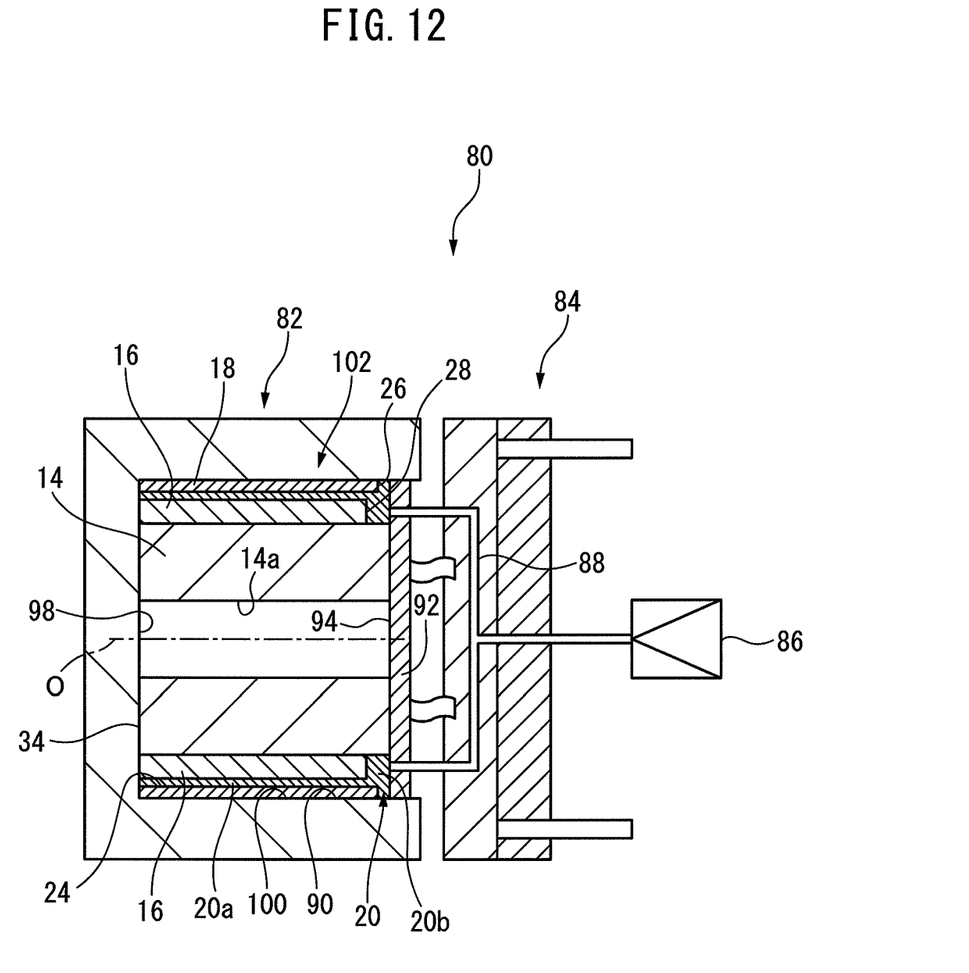
FIG. 12 is a cross-sectional view showing a state at the end of step S5 in FIG. 5 when the rotor shown in FIG. 1 is produced.
Figure 13:
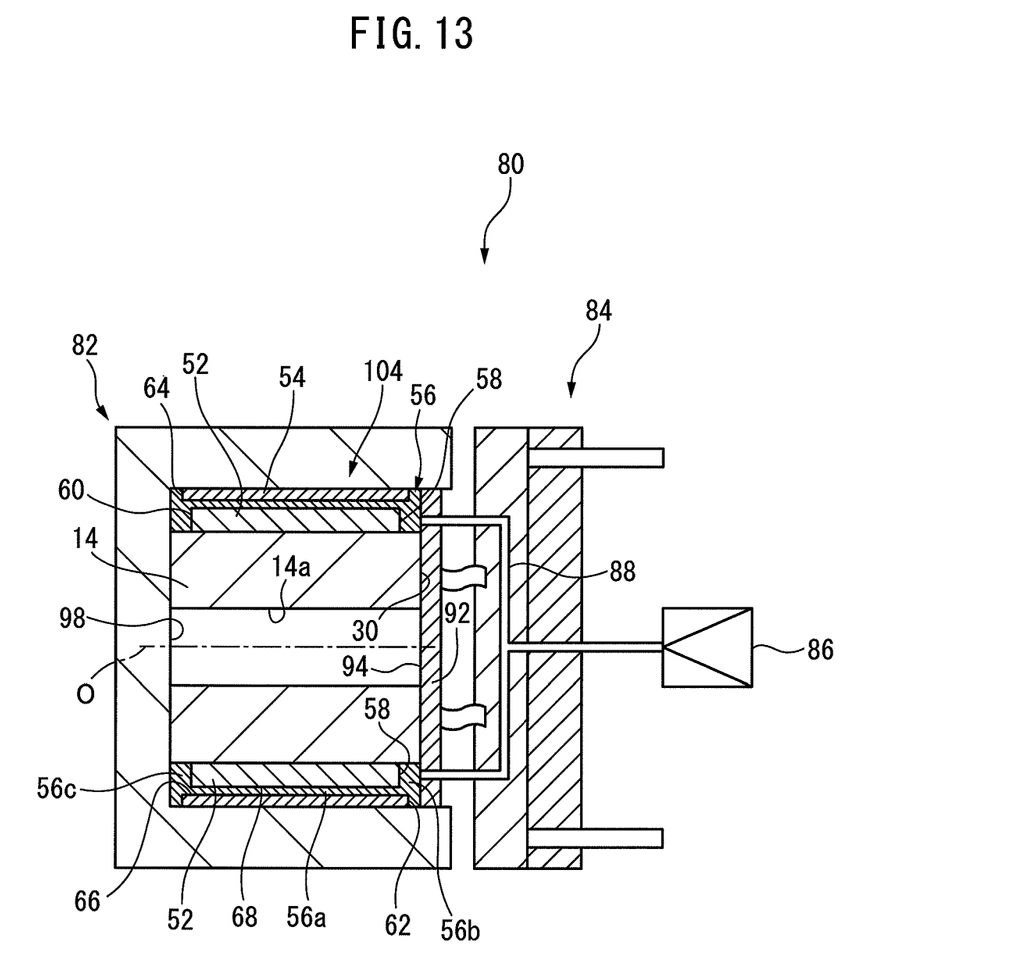
FIG. 13 is a cross-sectional view showing a state at the end of step S5 in FIG. 5 when the rotor shown in FIG. 3 is produced.

At step S5, the injection machine 80 injects resin into the gap between the inner peripheral surface 24 or 66 of the cover tube 18' or 54' and the outer peripheral surface 22 of the rotor core 14.

As an example, if the rotor 10 is produced, the injection machine 80 drives the resin supply unit 86 so as to supply resin into the hot runner 88 to inject the resin from the resin-injection nozzles 96 into the gap between the inner peripheral surface 24 of the cover tube 18' and the outer peripheral surface 22 of the rotor core 14.

Thereby, the resin is introduced into the gap between the inner peripheral surface 24 of the cover tube 18' and the outer peripheral surface 22 of the rotor core 14. Consequently, the cover tube 18' expands radially outward due to the pressure of the introduced resin so as to contact the side face 100 of the cavity 90. As a result, the aforementioned cover tube 18 is formed.

The resin injected from the resin-injection nozzles 96 is filled in the gap between the outer peripheral surface 22 of the rotor core 14 and the inner peripheral surface 24 of the cover tube 18, and between the outer surfaces 38 of the magnets 16 and the inner peripheral surface 24. In addition, the injected resin is also filled in the space between the pressurizing surface 94 and the end face 26 of the cover tube 18, and between the pressurizing surface 94 and the end faces 28 of the magnets 16.

Consequently, the resin 20 having the main body 20a and the ring 20b is formed. This state is shown in FIG. 12. At this step S5, an assembly 102 comprised of the rotor core 14, the magnets 16, the cover tube 18, and the resin 20 is produced.

As described above, the axial dimension $D_3$ of the cover tube 18 is set to be greater than the axial dimension $D_2$ of each magnet 16 (i.e., $D_2<D_3$). Due to this, the axially rear end face 26 of the cover tube 18 is located to be separate axially rearward from the axially rear end faces 28 of the magnets 16.

According to this configuration, the cover tube 18 can cover the entire area of the magnets 16 in the axial direction. Thereby, since the cover tube 18 can uniformly receive the centrifugal forces of the magnets 16 generated upon the operation of the rotor 10, it is possible to prevent an eccentricity caused by the deformation of the components of the rotor 10 in operation from being occurred in the rotor 10.

Further, the ring 20b of the resin 20 formed at this step S5 contacts the inner peripheral surface 24 of the cover tube 18. Due to this, since the cover tube 18 can prevent the radially outward displacement of not only the magnets 16 but the ring 20b during the operation of the rotor 10, it is possible to effectively enhance the strength of the rotor 10 in the radial direction.

As another example, if the rotor 50 is produced, the injection machine 80 drives the resin supply unit 86 so as to supply resin into the hot runner 88 to inject the resin from the resin-injection nozzles 96 into the gap between the inner peripheral surface 66 of the cover tube 54' and the outer peripheral surface 22 of the rotor core 14.

Thereby, the resin is introduced into the gap between the inner peripheral surface 66 of the cover tube 54' and the outer peripheral surface 22 of the rotor core 14. Consequently, the cover tube 54' expands radially outward due to the pressure of the introduced resin so as to contact the side face 100 of the cavity 90. As a result, the aforementioned cover tube 54 is formed.

The resin injected from the resin-injection nozzles 96 is filled in the gap between the outer peripheral surface 22 of the rotor core 14 and the inner peripheral surface 66 of the cover tube 54, and between the outer surfaces 68 of the magnets 52 and the inner peripheral surface 66. In addition, the injected resin is also filled in the space between the bottom surface 98 of the cavity 90 and the axially front end face 64 of the cover tube 54, and between the bottom surface 98 and the axially front end faces 60 of the magnets 52.

Further, the injected resin is also filled in a space between the pressurizing surface 94 and the axially rear end face 62 of the cover tube 54, and between the pressurizing surface 94 and the axially rear end faces 58 of the magnets 52.

Consequently, the resin 56 having the main body 56a, the first ring 56b, and the second ring 56c is formed. This state is shown in FIG. 13. By this step S5, an assembly 104 comprised of the rotor core 14, the magnets 52, the cover tube 54, and the resin 56 is produced.

As described above, the axial dimension $D_5$ of the cover tube 54 is set to be greater than the axial dimension $D_4$ of each magnet 52 (i.e., $D_4<D_5$). Due to this, the axially rear end face 62 of the cover tube is located so as to be separate axially rearward from the axially rear end faces 58 of the magnets 52, and the axially front end face 64 of the cover tube 54 is located so as to be separate axially forward from the axially front end faces 60 of the magnets 52.

According to this configuration, the cover tube 54 can cover the entire area of the magnets 52 in the axial direction. Thereby, since the cover tube 54 can uniformly receive the centrifugal forces of the magnets 52 generated upon the operation of the rotor 50, it is possible to prevent an eccentricity caused by the deformation of the components of the rotor 50 in operation from being occurred in the rotor 50.

Further, the first ring 56b and the second ring 56c of the resin 56 formed at this step S5 contact the inner peripheral surface 66 of the cover tube 54. Due to this, since the cover tube 54 can prevent the radially outward displacement of not only the magnets 52 but the first and second rings 56b and 56c during the operation of the rotor 50, it is possible to effectively enhance the strength of the rotor 50 in the radial direction.

At step S6, the manufacturer fits the rotary shaft 12 into the rotor core 14. Specially, the manufacturer prepares the rotary shaft 12, and fits the rotary shaft 12 into the through-hole 14a of the rotor core 14 of the assembly 102 or 104 produced at step S5, so as to be fixed there.

For example, the rotary shaft 12 is fixed in the through-hole 14a of the rotor core 14 by shrink-fit. By this step S6, the rotor 10 shown in FIG. 1 or the rotor 50 shown in FIG. 3 is produced.

Note that, the axial dimensions $D_2$ and $D_4$ of the magnets 16 and 52 and the axial dimensions $D_3$ and $D_5$ of the cover tubes 18 and 54 are set to be smaller than the axial dimension $D_1$ of the rotor core 14 when the pressurizing plate 92 is pressed against the axially rear end face 30 of the rotor core 14 by a predetermined force (e.g., 40 MPa) at step S4.

In this respect, the axial dimension $D_1$ of the rotor core 14 when the pressurizing plate 92 is pressed against the end face 30 of the rotor core 14 at step S4 can be defined by the following Equation 1.

$$D_1 = (t - \xi) \times n \quad \text{(Equation 1)}$$

In Equation 1, "t" is the axial thickness of each magnetic steel sheet constituting the rotor core 14, "ξ" is the amount of elastic deformation of each magnetic steel sheet in the axial direction when the pressurizing plate 92 is pressed against the rotor core 14 by a predetermined force (e.g., 40 MPa) at step S4, and "n" is the number of magnetic steel sheets constituting the rotor core 14.

Further, each magnet 16 or 52 may be comprised of a plurality of magnet-segments arranged so as to align in the axial direction. In this case, the axially front end faces 32 or 60 of the magnets 16 or 52 are defined by the axially front end faces of the magnet-segments, which are arranged at the most forward positions in the axial direction, among the plurality of magnet-segments.

Further, the axially rear end faces 28 or 58 of the magnets 16 or 52 are defined by the axially rear end faces of the magnet-segments, which are arranged at the most rearward positions in the axial direction, among the plurality of magnet-segments. Further, the cover tube 18 or 54 and the magnets 16 or 52 may have the same axial dimension.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing in the claims, specification, and drawings, even when the order of operations is described using the terms "first", "next", "subsequently", "then", etc., for convenience, maintaining this order is not necessarily essential for working the inventions.

The invention claimed is:

1. A rotor of an electric motor, comprising:
   a rotor core;
   a plurality of magnets arranged radially outside of the rotor core;
   a cylindrical cover tube surrounding the plurality of magnets; and
   resin filled in a gap formed between an outer peripheral surface of the rotor core and an inner peripheral surface of the cover tube,
   wherein an axial dimension of the rotor core is greater than axial dimensions of the plurality of magnets and an axial dimension of the cover tube, wherein proximal ends of the plurality of magnets, the cylindrical cover tube and rotor align in an axial direction and distal ends of the plurality of magnets, the cylindrical cover tube and rotor do not align in an axial direction so that there is a ring of resin located at the distal ends of the plurality of magnets and the cover tube.

2. The rotor according to claim 1, wherein the axial dimension of the cover tube is greater than the axial dimensions of the plurality of magnets.

\* \* \* \* \*